March 15, 1966
G. C. GILBERT ET AL
3,240,091
METHOD OF PERFORATING AN ARTICLE
Filed April 13, 1962
2 Sheets-Sheet 1
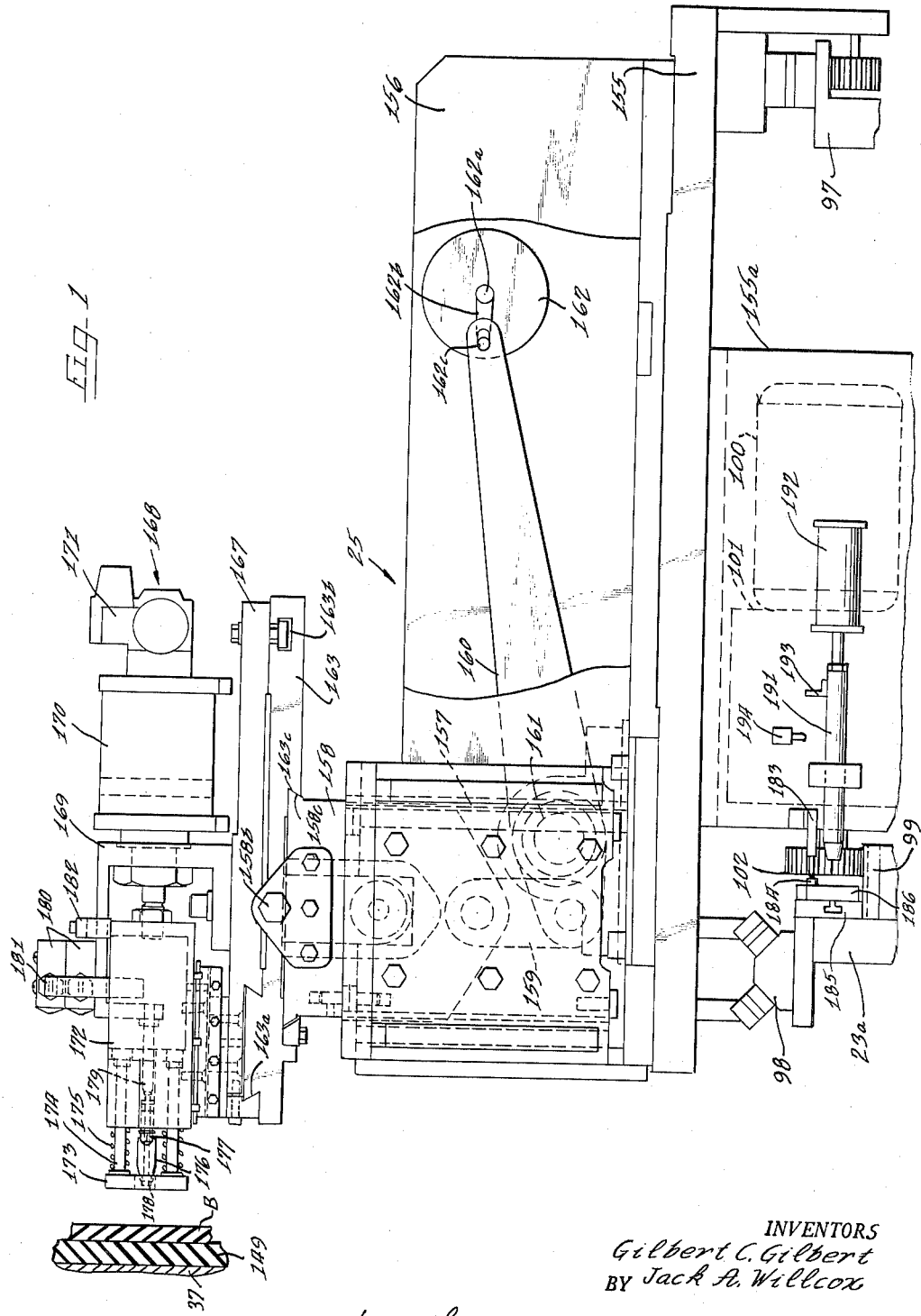
INVENTORS
Gilbert C. Gilbert
BY Jack A. Willcox
Hill, Sherman, Meroni, Gross & Simpson
ATTORNEYS March 15, 1966 G. C. GILBERT ET AL 3,240,091
METHOD OF PERFORATING AN ARTICLE
Filed April 13, 1962 2 Sheets-Sheet 2
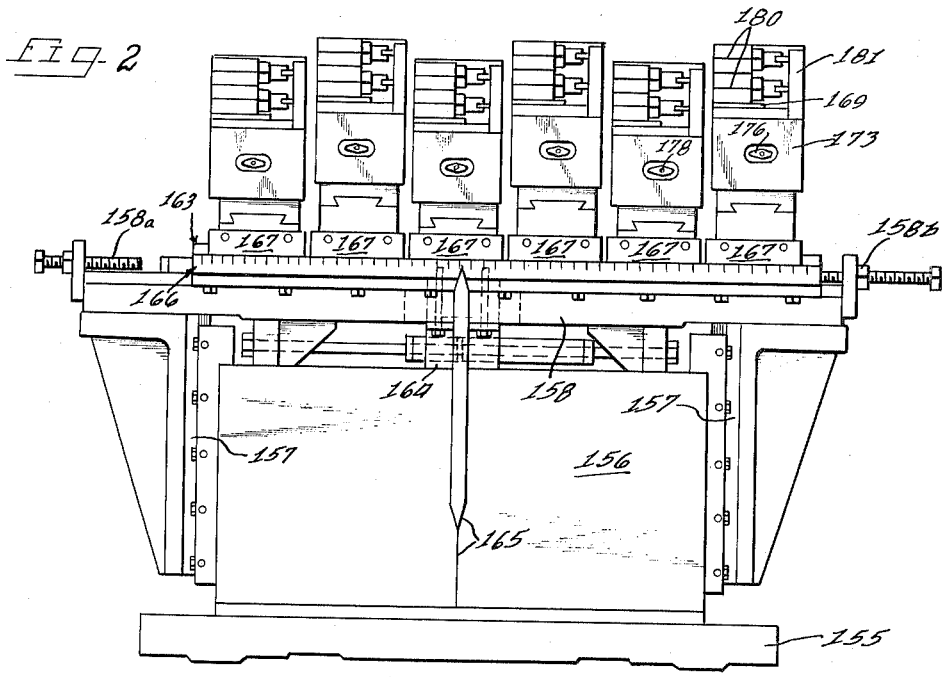
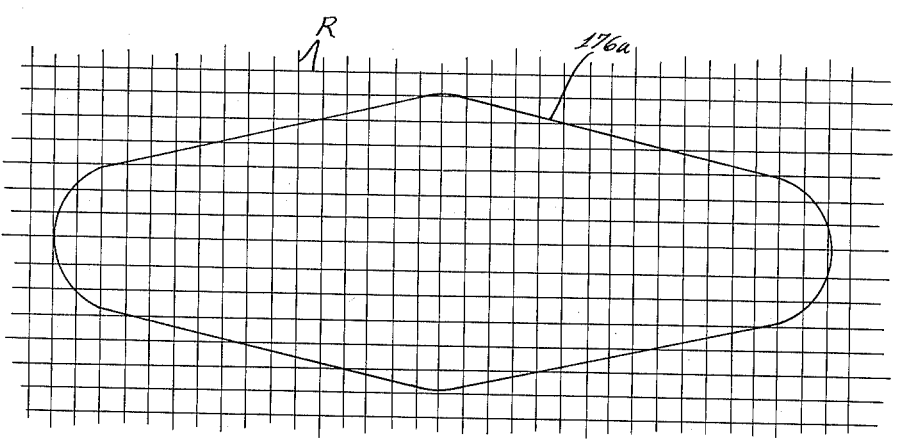
INVENTORS
Gilbert C. Gilbert
BY Jack A. Willcox
ATTORNEYS

# United States Patent Office 3,240,091
Patented Mar. 15, 1966

3,240,091
METHOD OF PERFORATING AN ARTICLE
Gilbert C. Gilbert, Beloit, Wis., and Jack A. Willcox, Rockford, Ill., assignors to Beloit Corporation, Beloit, Wis., a corporation of Wisconsin
Filed Apr. 13, 1962, Ser. No. 187,376
4 Claims. (Cl. 83—50)

This invention relates generally to a method for perforating an article, and more specifically to a method for punching a massive rubber belt.

Although the principles of the present invention may be included in various devices and methods, a particularly useful application is made in connection with the machining of massive rubber belts. In particular, suction boxes of paper making machinery employ such a belt, and by way of illustration, such a belt may have a width of twenty-five feet, a length of thirty-five feet, and a mass so great that the same can be handled best by a crane during installation, removal, and handling thereof. A belt of this type is typically employed between the Fourdrinier wire and the suction box of a paper making machine, and to that end is provided with perforations therethrough which terminate in elongated grooves directed toward the Fourdrinier wire. To adapt such a massive rubber belt to such a usage, it therefore is necessary to provide such grooves and perforations. In a belt of this size, many thousands of grooves and perforations are required.

Accordingly, it is an object of this invention to provide a method of perforating an article.

It is a further object of this invention to provide a method for perforating a massive belt.

It has also been learned that belt life may be lengthened when the holes in the belt are arranged in a staggered fashion.

Accordingly, yet another object of the instant invention is to provide apparatus which will produce belt perforations or holes arranged in a staggered fashion, the pattern of staggering being relatively unrestricted or flexible, and each hole being accurately located.

A still further object of the present invention is to provide a method of perforating a massive rubber belt in an efficient manner wherein each perforation or opening is defined by rubber which has been machined or cut to be smooth to the touch.

Yet another object of the present invention is to provide a method for driving and retracting a cold punch so as to effect a smooth cut in a rubber belt.

A still further object of the present invention is to provide a method and means whereby a plurality of punches may be used substantially simultaneously without their sticking in rubber being punched thereby.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

As shown on the drawings:

FIGURE 1 is a side elevational view of a machining head employed for perforating the belt by punching;

FIGURE 2 is an elevational view of the punching head assembly of FIGURE 1 as viewed from the belt; and FIGURE 3 is an enlarged diagram illustrating the configuration of the rubber to be removed from the belt during punching.

The principles of this invention are particularly useful when embodied in a belt machining device or punching head assembly such as illustrated in FIGURE 1, generally indicated by the numeral 25. It is contemplated that the punching described below will be carried out with the belt B in a stationary locked position, or succession of stationary locked positions, and with the belt B supported by a back-up beam 37. The support structure for the punching head assembly 25 includes a pair of elongated tracks or rails 97, 98 supported on a track and template support 23a and extending transversely to the machine and parallel to the back-up beam 37. The tracks 97, 98 are stationary and have an elongated configuration which preferably is somewhat greater than the width of the belt B. Thus, for example, if the belt B is twenty-five feet in width, a typical length for the tracks 97 and 98 would be fifty-five feet. A gear rack 99 extends substantially coextensively with the track 98, and is secured in fixed relation to the track 98. The punching head assembly 25 is provided with suitable means for supporting the head on the tracks 97 and 98 so as to be movable thereon, and, to effect such movement, a suitable mechanism having a driving engagement with the rack 99 is provided. Thus, by way of example, the head assembly 25 includes an electric motor 100 acting through a speed-reducing gear assembly 101 to drive a gear 102 which is in mesh with the gear rack 99.

To provide power to the motor 100, to provide compressed air to the head assembly 25, and to provide other appropriate control thereof, the punching head 25 includes a cable which comprises an assembly of all of the different hoses and wiring required. Since the head 25 is movable for a considerable distance on the tracks 97 and 98, the cable of hoses and wiring is of considerable length and is supported as required.

During machining of the belt B by this machine, a portion of the belt passes in front of the back-up member 37. The inner or rear face of the vertical portion of the belt B is engaged by a rubber platten 149 to support the same. The rubber platten 149 preferably is slightly harder than the belt B, and the platten 149 has not been drawn to scale.

The structure shown in FIG. 1 is adapted to provide suction apertures. The punching head assembly 25 includes a base plate 155 supported on the tracks 97, 98 and driven therealong by means described above. Thus, the electric motor 100 drives the pinion 102 through the gear box 101, the pinion 102 being engaged with the rack 99 supported by the track and template support 23a.

On the base plate 155, there is provided a box-like frame 156 having a vertical pair of dovetails 157, 157 which vertically slidably guides a lower slide assembly 158 of a saddle-like configuration. The lower slide assembly 158 is vertically supported by a link 159 pivotally secured thereto and to a lifting lever 160, the lever 160 being pivoted as at 161 to the frame 156. Acting between the opposite end of the lever 160 and the frame 156, there is a pneumatic rotary actuator 162 of a known type. The actuator 162 includes an output shaft 162a acting through an arm 162b and pin 162c, the pin 162c being received within a slot in the lever 160. The rotary actuator 162 is of the type that has a full travel less than half a turn. When the actuator 162 drives in a counterclockwise direction as illustrated, the link 159 is raised to shift the saddle-like lower slide assembly 158 upwardly with respect to the frame 156 by an amount corresponding to one-half groove, the same amounting to three-eighths inch in the foregoing example.

The lower slide assembly 158 slidably supports an upper slide assembly 163 for movement between adjustable stops 158a and 158b. This movement is effected by a double acting actuator 164 shown in FIGURE 2, the cylinder of which is secured by an appropriate bracket to the upper slide assembly 163, and the double ended rod of which is secured to the lower slide assembly 158. To facilitate setting up the head assembly 25 for punching a predetermined pattern, there is provided a pointer and index structure 165 carried by the frame 156, the upper end of the pointer registering with a scale 166 on the upper slide assembly 163. The index and pointer structure 165 represents the center or reference point of a pattern, with respect to which various punching assemblies to be described may be located. While these may be locked in a single position by means of the stops 158a, 158b, it is preferable that the stops 158a and 158b enable movement of the upper slide assembly 163 in response to forces provided by the actuator 164 so that the pattern may be shifted horizontally if desired to produce a horizontally offset pattern, as is explained more fully below.

The upper slide assembly 163 has an upwardly directed dovetail 163a and an upwardly opening T-slot 163b with which corresponding means on the bottom of a punch assembly base 167 may cooperate for attachment purposes. It will be noted that six such punches have been illustrated in FIGURE 2 so as to be able to provide six perforations substantially at the same time in a particular set of belt grooves. It is to be understood that where a lesser number of holes is desired, the extra punches may be either physically removed or electrically disabled. It is evident that by the removal of one of the punch assembly bases 167 and its associated punch, a greater variety in lateral spacing is enabled. Further, it is to be noted from FIGURE 2 that the punch assembly bases 167 may be provided in various thicknesses, two such thicknesses being illustrated. Thus, there is a plurality of a punch assembly bases of the same thickness. The vertical staggering thus provided and illustrated in FIGURE 2 enables the punching of belt perforations by three of the illustrated punches in one groove, and by the other three in the adjacent groove.

Referring now to FIGURE 1, each of the punch assembly bases 167 supports a punch assembly or punching unit generally indicated at 168. Each punching unit 168 includes a U-shaped bracket 169 bolted to the base 167 and supporting an air cylinder or actuator 170 which is under the operative control of an electric high speed pneumatic valve 171. The rod of the air cylinder or actuator 170 is connected to a box-shaped slide 172, the lower surface of which comprises a dovetail coacting with dovetail structure on the base 167. In front of the box-shaped slide 172 there is a presser and stripper plate 173 to which a number of bolts 174 are attached. The bolts 174 are slidably received in and guided by the slide 172, their heads serving to limit forward movement thereof. A number of springs 175 act between the presser and stripper plate 173 and the box-shaped slide 172 to bias the presser and stripper plate toward the belt B. A hollow punch 176 is secured to the box-shaped slide 172 by a clamping means indicated at 177. Within the punch 176, there is a plunger 178 which extends completely therethrough and which is retained therein by a shoulder on such plunger, the plunger 178 being engageable with a stop 179 secured fixedly to an extension of the U-shaped bracket 169. The bracket 169 also supports a pair of limit switches 180, the upper one of which is adapted to be tripped by a dog 181 at the rearward end of a stroke, and the lower one of which is adapted to be tripped by a second dog 182 at the forward end of the stroke.

When the valve 171 admits air to the cylinder or actuator 170, the box slide 172 is driven forwardly so that the plate 173 engages the belt B and presses it firmly against the platten 149. Further movement of the slide 172 compresses the springs 175 storing energy therein, and also advances the punch 176 with respect to the plate 173 and into the belt B. Further movement causes the cutting edge of the punch 176 to pass entirely through the belt B, a rubber slug thus being received within the punch 176. Upon reversal of movement of the actuator cylinder 170, the box slide 172 is retracted. The air cylinder 170 is a double-acting type and therefore, a positive force is applied to withdraw the punch 176 from the belt B. During such withdrawal, the springs 175 continue to hold the plate 173 against the belt B to assist in stripping the same from the outer periphery of the punch 176. After the heads of the bolts 175 have re-engaged the slide 172, and the slide 172 has retracted further to create a gap between the plate 173 and the belt B, the inner end of the plunger 178 engages the stop 179, thereby arresting movement of the plunger 178. This also arrests the rearward movement of the rubber slug within the punch 176, and further retraction of the slide 172 and punch 176 strips the punch 176 from the now-stationary rubber slug to eject the same. It will be noted that the plunger 178 has a length which enables it to project from the cutting edge of the punch 176 when the punch is retracted, thereby positively insuring complete ejection of the rubber slug.

If the foregoing operation were carried out gradually, the edges of the resulting hole in the belt B would lack the smoothness of finish required. Heretofore it has been the practice to provide a heater for the punch to thereby obtain the requisite smoothness. However, in this invention, the requisite smoothness is obtained with the punch 176 remaining at room temperature. To this end, the valve 171 comprises a high speed valve which drives the punch 176 forward at a rapid rate, the rate being maintained substantially through the thickness of the belt. The total travel which the cylinder 170 could provide would send the cutting edge of the punch 176 into the rubber platten 149 by a substantial distance which would damage the platten. However, the forward movement of the punch 176 is arrested after approximately .010" indentation into the platten 149. This is done by the admission of air into the cylinder 170 for returning its piston to its retracted position while it is still moving in a forward direction. The dashed lines on the air cylinder 170 represent the reversing position of the piston of the air cylinder 170 which is there cushioned and arrested by air rather than being moved to the fully forwardly extended position, expansion of such cusioning air effecting a rapid return of the cylinder. This type of movement may be likened to that of a bouncing ball. It is thus evident that the actual operating travel of the punching unit 168 must be established under dynamic operating conditions rather than static or slowly moving operating conditions. While the illustrated structure is operable in a conventional method of operation, the novel "bouncing" method of operating the same which is described above has been found to provide a smooth cut in the belt B, even though the punch 176 is at room temperature.

It has also been discovered that if all of the six punching units 168 are advanced simultaneously into the belt, the several punching units 176 coact in the manner of wedges, whereby they all stick and none is returned by action of its air cylinder 170. Accordingly, a further method of operating the punches 168 includes the utilization of the switches 180 to control the same. The lower switch 180, tripped by the dog 182 shortly before the forward end of the stroke, reverses the air supply to the cylinder 170 as already described. The upper switch 180 is tripped by the dog 181 at the end of the stroke, and one of its chief functions is to initiate admission of air into the air cylinder 170 of the next succeeding punching unit 168. Thus, a movement of one punching unit 168 controls the succeeding punch. This type of movement has two distinct advantages. One of these is that with only one punch 176 in the belt at any particular instant, that punch will not stick due to wedging by adjacent punches. The second advantage is that with only one valve 171 energized and drawing air at any particular instant, the pressure drop at the source of air pressure is minimized, thereby maintaining full available pressure to each air cylinder 170. Nevertheless, the automatic sequencing of the several punching units 168 is so rapid that for ordinary practical purposes, namely the time required to perform the operation, the several holes are punched substantially simultaneously.

It is evident that the punching head may be indexed along the tracks 97 and 98 to various positions therealong, each such position representing a row of grooves. Stated otherwise, the punching head 25 may be employed at successive adjacent positions across the width of the belt, the rotary actuator 162 being operated to its alternate positions as the head moves from one to the next row of grooves where groove staggering is employed. This type of punching preferably is performed beginning at the center row of grooves, then working toward each of the opposite belt edges. As this type of punching continues, any growth of belt length may be compensated for.

It is preferable that the grooving pattern in the belt B be arranged so that there is a central row of grooves flanked by one or more rows of grooves on alternate sides thereof and symmetrical about the center line. Where the size of belt and size of groove enables the provision of an odd number of grooves, the provision of a central groove is inherent. Where the sizes are such that an even number of grooves would appear to be required, it is preferable to make the number odd artificially by dividing one of the grooves into two lengths of half a length each, respectively disposed near the edges of the belt B. Thus, in an example, theoretically 12 rows of grooves are needed. One such row is disposed in the center, five rows are placed on either side thereof, and the 12th row is split, half of it appearing near the left edge and half near the right edge. Such a pattern arrangement is of primary importance and benefit in connection with punching a belt. Once such a pattern has been obtained, it is possible and is recommended to punch the central row around the entire length of the belt first, then to punch the immediately adjacent row on one side of the center row, then to punch the other immediately adjacent row on the other side of the central row, then punching either of the next rows immediately adjacent to the punched portion, etc., alternating back and forth adjacent to the punched portion until the edge of the belt is reached. It has been found that by use of this punching method, hole location along the length of the groove within any particular groove may be maintained in production within .010 inch tolerance, such tolerance being nonaccumulative within a groove. Thus, such a punching technique is advantageous in allowing for or controlling the effect of lateral belt growth due to perforating the belt.

Assuming that the punching head 25 produces six holes per groove by means of the arrangement shown in FIGURE 2, such would be satisfactory for the eleven center rows in the example. But the one-half-length rows adjacent to each edge of the belt B would require due allowance for the reduction in length, such allowance being automatic. To this end, there has been provided a switch 183 carried by a part 155a rigidly secured to the base plate 155, which switch 183 engages an adjustably positioned trip dog 184 carried on the track support 23a. The switch 183 is connected in circuit to disable such of the punch units 168 as are not required for the half-length grooves. Further the switch 183 is also connected to control the actuator 164 to shift the upper slide assembly 163 by such an amount as may be necessary for the same purpose without upsetting other settings and adjustments required at other punching head positions.

In order that the holes produced by the punching head assembly 25 at any position thereof along the tracks 97 and 98 be accurately established, there is provided upon the track support 23a a T-slotted rail 185 extending along the length thereof which supports a selected number of templates such as 186. The various templates such as 186 are joined together in selected spaced relation to each other and are secured as by nut and bolt assemblies 189 to the T-slotted rail 185. Each template includes a number of tapered openings or recesses, each such tapered recess being alternatively receptive of a shot pin 191 having a tapered entrant end, the shot pin 191 being positioned by a relatively strong pneumatic actuator 192. When the punching head assembly 25 is positioned on the tracks 97 and 98 in substantially the desired position, the actuator 192 extends the shot pin 191 into the template 186. Normally the preliminary positioning will not be precise, and the coaction between the shot pin 191 and the template 186 effected by the taper therein shifts the punching head assembly 25 by a small increment so as to locate and lock the punching head assembly 25 accurately in a predetermined position. Once the shot pin 191 is fully seated, and the punching head assembly 25 has been thereby accurately positioned, a trip dog 193 carried by the shot pin 191 will actuate a switch 194 which serves as an interlock in the control circuit which thereby enables or permits the actual punching to take place.

Although various minor modifications might be suggested by those versed in the art, it should be understood that we wish to embody within the scope of the patent warranted hereon all such embodiments as reasonably and properly come within the scope of our contribution to the art.

We claim as our invention:
1. A method of perforating a rubber belt comprising:
   (a) imparting a high velocity to a punch to carry it completely through the belt while the punch is moving substantially at such high velocity; and
   (b) while the punch is still moving substantially at such high velocity, applying a force to the punch in the opposite direction to arrest punch movement just after it has penetrated the belt and by said force to retract the punch at a high velocity.
2. A method of perforating a rubber belt comprising:
   (a) imparting a high velocity to a punch to carry it completely through the belt while the punch is moving substantially at such high velocity; and
   (b) while the punch is still moving substantially at such high velocity, applying by means of compressed air a pneumatic force to the punch in the opposite direction to cushion and to arrest punch movement just after it has penetrated the belt and by expansion of the cushioning air to immediately retract the punch at a high velocity.
3. A method of producing a smooth perforated hole in a rubber belt with a room-temperature punch, comprising:
   (a) imparting a high velocity to the room-temperature punch by means of a force obtained from compressed air to advance the punch completely through the belt, and
   (b) applying a force obtained from compressed air to the punch in the opposite direction to arrest the advance of the punch in a cushioning manner and by said force to retract the punch from the belt.
4. A method of producing a plurality of holes in an article, comprising:
   (a) imparting a high velocity only to a first one of a plurality of punches by applying a pneumatic force thereto to advance it completely and rapidly through the article;
   (b) applying a further pneumatic force to said one punch in the opposite direction to rapidly retract said one punch;
   (c) employing a movement of said one punch to initiate the flow of air by which further pneumatic forces are applied to a second of said punches to advance and to retract the second punch in the manner in which said first punch is advanced and retracted; and
   (d) successively employing a movement of said second punch and any further ones of said punches to initiate the flow of air by which further pneumatic forces are applied to any respectively succeeding ones of said punches to advance and to retract the succeeding punches in said manner.

References Cited by the Examiner
UNITED STATES PATENTS

| | | | |
|---|---|---|---|
| 343,174 | 6/1886 | Hewes | 83—671 |
| 576,338 | 2/1897 | Brine | 83—519 X |
| 855,742 | 6/1907 | Allen | 83—426 |
| 968,122 | 8/1910 | Carr | 83—55 |
| 1,172,254 | 2/1916 | Booth | 83—214 |
| 1,236,963 | 8/1917 | Maxwell | 83—426 |
| 1,341,450 | 5/1920 | Zawistowski | 83—217 |
| 1,661,533 | 3/1928 | Gantz | 83—217 |
| 1,751,549 | 3/1930 | Hope et al. | 83—5 |
| 1,895,025 | 1/1933 | Dean | 83—34 |
| 2,040,364 | 5/1936 | Dean | 83—34 |
| 2,232,742 | 2/1941 | Smith | 83—55 |
| 2,465,453 | 3/1949 | Holbrook | 83—240 |
| 2,677,313 | 5/1954 | Biegert | 83—5 |
| 2,818,881 | 1/1958 | Bonner et al. | 83—214 X |
| 2,876,835 | 3/1959 | Catalano | 83—240 |
| 2,961,907 | 11/1960 | Hohlbein | 83—13 |
| 2,981,329 | 4/1961 | Justus | 162—367 |
| 3,004,456 | 10/1961 | Moser | 83—639 X |
| 3,025,910 | 3/1962 | Beachler et al. | 162—367 |
| 3,036,486 | 5/1962 | Wilcox | 83—671 |
| 3,059,842 | 10/1962 | Wadey | 234—107 X |
| 3,064,511 | 11/1962 | Allender | 83—13 |
| 3,066,859 | 12/1962 | Darwin et al. | 234—107 |
| 3,140,634 | 7/1964 | McDaniel | 83—639 X |

FOREIGN PATENTS 149,742  8/1920  Great Britain

OTHER REFERENCES

Abramson: High Speed Pneumatic Serial Punch, IBM Technical Disclosure Bulletin, vol. 3, No. 10, March 1961 (page 1 relied on).

WILLIAM W. DYER, JR., *Primary Examiner.*

MORRIS O. WOLK, ANDREW R. JUHASZ,
*Examiners.*